United States Patent
Carr et al.

(10) Patent No.: US 7,137,861 B2
(45) Date of Patent: Nov. 21, 2006

(54) INTERACTIVE THREE-DIMENSIONAL MULTIMEDIA I/O DEVICE FOR A COMPUTER

(76) Inventors: Sandra L. Carr, 540 NE. 8th St., Suite 2B, Ft. Lauderdale, FL (US) 33304; G. Richard Geldbaugh, 230 Hendricks Isle, Ft. Lauderdale, FL (US) 33301

( * ) Notice: Subject to any disclaimer, the term of this patent is extended or adjusted under 35 U.S.C. 154(b) by 38 days.

(21) Appl. No.: 10/604,387

(22) Filed: Jul. 16, 2003

(65) Prior Publication Data

US 2004/0103222 A1 May 27, 2004

Related U.S. Application Data

(60) Provisional application No. 60/428,359, filed on Nov. 22, 2002.

(51) Int. Cl.
*A63H 3/28* (2006.01)
*A63H 11/00* (2006.01)
*A63H 13/00* (2006.01)

(52) U.S. Cl. ............... 446/298; 446/297; 446/331; 715/727; 715/771

(58) Field of Classification Search ........... 345/727, 345/771; 446/298, 297
See application file for complete search history.

(56) References Cited

U.S. PATENT DOCUMENTS

| | | | |
|---|---|---|---|
| 4,717,364 A | 1/1988 | Furukawa | |
| 4,802,879 A | 2/1989 | Rissman et al. | |
| 4,840,602 A | 6/1989 | Rose | |
| 4,846,693 A | 7/1989 | Baer | |
| 4,923,428 A | 5/1990 | Curran | |
| 5,021,878 A | 6/1991 | Lang | |
| 5,142,803 A | 9/1992 | Lang | |
| 5,158,493 A | 10/1992 | Morgrey | |
| 5,288,078 A | 2/1994 | Cappet et al. | |
| 5,289,273 A | 2/1994 | Lang | |
| 5,324,225 A | 6/1994 | Satoh et al. | |
| 5,407,376 A | 4/1995 | Avital et al. | |
| 5,613,909 A | 3/1997 | Stelovsky | |
| 5,636,994 A * | 6/1997 | Tong | 434/308 |
| 5,647,787 A | 7/1997 | Raviv et al. | |
| 5,666,469 A | 9/1997 | Lee | |
| 5,673,369 A | 9/1997 | Kim | |
| 5,700,178 A | 12/1997 | Cimerman et al. | |
| 5,701,400 A | 12/1997 | Amado | |

(Continued)

OTHER PUBLICATIONS

Sega, Time Traveler, 1991, pp. 1-5.*

(Continued)

*Primary Examiner*—Kristine Kincaid
*Assistant Examiner*—Ryan Pitaro
(74) *Attorney, Agent, or Firm*—John C. Smith

(57) ABSTRACT

A motion based communications system having an animated device, which is controlled locally or over a network connection, and which uses motion to convey information to a user. The information can relate to a predefined system events, such as printer status changes, e-mail status, system errors or communications. Further, it can represent remote individuals in a chat room, or when playing games. Computer games can use it to represent a remote or local human or software opponent. Voice recognition software allows commands or data to be input to the system via the device. Multiple devices can be used for multiple remotely located users. A universal base unit allows characters to be replaceably attached to, and controlled by, the base unit. Different characters can be substituted for different games, etc. The device may be software controlled by any application program via a standard application program interface.

59 Claims, 8 Drawing Sheets

U.S. PATENT DOCUMENTS

| | | | |
|---|---|---|---|
| 5,733,131 A | 3/1998 | Park | |
| 5,734,794 A | 3/1998 | White | |
| 5,741,136 A | 4/1998 | Kirksey et al. | |
| 5,746,602 A * | 5/1998 | Kikinis | 434/169 |
| 5,752,880 A | 5/1998 | Gabai et al. | |
| 5,766,077 A * | 6/1998 | Hongo | 463/30 |
| 5,855,483 A | 1/1999 | Collins et al. | |
| 5,870,842 A * | 2/1999 | Ogden et al. | 40/411 |
| 6,017,261 A | 1/2000 | Wachtel | |
| 6,046,727 A | 4/2000 | Rosenberg et al. | |
| 6,054,999 A | 4/2000 | Strandberg | |
| 6,064,421 A | 5/2000 | Pohl | |
| 6,064,854 A | 5/2000 | Peters et al. | |
| 6,160,986 A | 12/2000 | Gabai et al. | |
| 6,192,215 B1 * | 2/2001 | Wang | 434/307 R |
| 6,206,745 B1 | 3/2001 | Gabai et al. | |
| 6,220,865 B1 | 4/2001 | Macri et al. | |
| 6,246,420 B1 | 6/2001 | Mochizuki et al. | |
| 6,256,378 B1 | 7/2001 | Iggulden et al. | |
| 6,257,948 B1 | 7/2001 | Silva | |
| 6,281,820 B1 | 8/2001 | Fields | |
| 6,290,565 B1 * | 9/2001 | Galyean III et al. | 446/99 |
| 6,290,566 B1 | 9/2001 | Gabai et al. | |
| 6,309,275 B1 | 10/2001 | Fong et al. | |
| 6,319,010 B1 | 11/2001 | Kikinis | |
| 6,352,478 B1 | 3/2002 | Gabai et al. | |
| 6,353,773 B1 | 3/2002 | Takenaka | |
| 6,358,111 B1 | 3/2002 | Fong et al. | |
| 6,362,589 B1 | 3/2002 | Inoue et al. | |
| 6,375,535 B1 | 4/2002 | Fong et al. | |
| 6,375,572 B1 | 4/2002 | Masuyama et al. | |
| 6,394,872 B1 | 5/2002 | Watanabe et al. | |
| 6,421,524 B1 | 7/2002 | Padgett | |
| 6,454,625 B1 | 9/2002 | Fong et al. | |
| 6,460,851 B1 * | 10/2002 | Lee et al. | 273/238 |
| 6,462,498 B1 | 10/2002 | Filo | |
| 6,463,257 B1 | 10/2002 | Wood | |
| 6,466,145 B1 | 10/2002 | Fields | |
| 6,466,844 B1 | 10/2002 | Ikeda et al. | |
| 6,466,971 B1 | 10/2002 | Humpleman et al. | |
| 6,471,565 B1 | 10/2002 | Simeray | |
| 6,476,714 B1 | 11/2002 | Mizuta | |
| 6,480,761 B1 | 11/2002 | Ueno et al. | |
| 6,480,896 B1 | 11/2002 | Brown et al. | |
| 6,483,906 B1 | 11/2002 | Iggulden et al. | |
| 6,493,606 B1 | 12/2002 | Saijo et al. | |
| 6,497,604 B1 | 12/2002 | Fong et al. | |
| 6,497,605 B1 | 12/2002 | Cummings et al. | |
| 6,497,607 B1 | 12/2002 | Hampton et al. | |
| 6,505,098 B1 | 1/2003 | Sakamoto et al. | |
| 6,512,965 B1 | 1/2003 | Osawa | |
| 6,514,117 B1 | 2/2003 | Hampton et al. | |
| 6,516,236 B1 | 2/2003 | Brown et al. | |
| 6,519,506 B1 | 2/2003 | Osawa | |
| 6,537,074 B1 | 3/2003 | Jurmain et al. | |
| 6,537,128 B1 | 3/2003 | Hampton et al. | |
| 6,537,152 B1 | 3/2003 | Seelig et al. | |
| 6,542,925 B1 | 4/2003 | Brown et al. | |
| 6,544,098 B1 | 4/2003 | Hampton et al. | |
| 6,546,436 B1 | 4/2003 | Fainmesser et al. | |
| 6,553,410 B1 | 4/2003 | Kikinis | |
| 6,554,616 B1 | 4/2003 | Love | |
| 6,554,679 B1 * | 4/2003 | Shackelford et al. | 446/268 |
| 6,554,706 B1 | 4/2003 | Kim | |
| 6,560,511 B1 | 5/2003 | Yokoo et al. | |
| 6,570,555 B1 | 5/2003 | Prevost et al. | |
| 6,571,141 B1 | 5/2003 | Brown | |
| 6,572,431 B1 * | 6/2003 | Maa | 446/301 |
| 6,579,143 B1 | 6/2003 | Rehkemper et al. | |
| 6,604,980 B1 | 8/2003 | Jurmain et al. | |
| 6,773,344 B1 * | 8/2004 | Gabai et al. | 463/1 |
| 6,800,013 B1 * | 10/2004 | Liu | 446/297 |
| 6,802,755 B1 * | 10/2004 | Walker et al. | 446/175 |
| 2001/0027397 A1 * | 10/2001 | Yeon | 704/272 |
| 2001/0041496 A1 | 11/2001 | Smirnov | |
| 2002/0116091 A1 | 8/2002 | Yamamoto | |
| 2002/0120362 A1 | 8/2002 | Lathan et al. | |

OTHER PUBLICATIONS

McPhail, S. Buddy Bugs: A Physical User Interface for Windows Instant Messenger, 2002, GroupLab University of Calgary.*

Steve Behrens, "We'll Look Back on This Old Barney: An Early Input-output Gizmo You Could Hug," Internet Ardcle, Jan. 19, 1998.*

Kaminsky et al., "Sweetpea: SoOare Tools for Programmable Embodied Agents," Internet Article, May 15, 1999.*

Steve Behrens, "We'll Look Back on This Old Barney: An Early Input-Output Gizmo You Could Hug," Internet Article, Jan. 19, 1998.

Kaminsky et al., "Sweetpea: Software Tools for Programmable Embodied Agents," Internet Article, May 15, 1999.

Kate Ehrlich et al., "Reviews for the Sweetpea Paper," Internet Article, May 15, 1999.

Mark Treglown, "Go Ahead and Jump-Using Syndetic Modelling to Think Formally about Play and the Usability of an Electronic Lifeform," Internet Article, Jun. 22, 1999.

Goose et al., "Streaming Speech3: A Framework for Generating and Streaming 3D Text-to-Speech and Audio Presentations to Wireless PDSs as Specified Using Extensions to SMIL," Internet Article, May 7, 2002.

Jakob Neilsen, "Making the Physical Environment Interactive," Internet Article, Aug. 5, 2002.

Saul Greenberg et al., "An Overview of Phidgets," Internet Article, Oct. 27, 2002.

Saul Greenberg et al., "Phidgets: Easy Development of Physical Interfaces through Physical Widgets," Internet Article, Oct. 27, 2002.

* cited by examiner

Prior Art

INTERACTIVE THREE-DIMENSIONAL MULTIMEDIA I/O DEVICE FOR A COMPUTER

CROSS REFERENCE TO RELATED APPLICATIONS

This application is a non-provisional application which claims the benefit of the commonly owned co-pending provisional application entitled "E.I.D. System" filed Nov. 22, 2002, bearing U.S. Ser. No. 60/428,359 and naming Sandra Carr and Richard Geldbaugh, the named inventors herein, as sole inventors, the contents of which is specifically incorporated by reference herein in its entirety.

BACKGROUND OF INVENTION

1. Technical Field

The present invention relates to computer input output (I/O) devices. In particular, it relates to a three-dimensional multimedia input output device for communication between a user and a computer. The device is three-dimensional, has motion capability, has audio output and input capability, and can be programmed to perform specific functions or entertainment activities related to communications between a computer and a user.

2. Background

Computers have become so prolific in modern society that they now may be considered to be almost in the category of common appliances. Not only does a substantial portion of the population have at least one computer, but also many individuals have several. Likewise, it is very difficult for most businesses to function without at least one computer. While most computers vary slightly from one another, they all tend to share similar methods of communicating between the computer and the user.

In a conventional computer system, output data is presented to a user primarily via a display screen and a printer. In addition, most operating systems which control computers use a variety of audio output signals of one kind or alert a user as to a specific condition such as the arrival of email, printer malfunctions, disk errors, etc. Likewise, attempts to allow users to communicate with computers by inputting voice commands and data has now reached the point where voice input can now be effectively used. Other mechanical devices, such as a keyboard and a mouse also allow users to enter data. These communication methods allow users to enter data in a variety of manners. However, they do little to increase the enjoyment of using a computer, especially for young people and children. It would be desirable to have a method of interaction with computers that allows individuals to receive output data from a computer, and input data into a computer, which provides a more "human-like" experience for the user, and which may provide the user with some amusement and entertainment at the same time.

One application which most computer users take advantage of is the ability to communicate via email. In an effort to make email more efficient, a variety of methods have been used to notify the user when an email is received. For example, one system uses a small icon that appears on the computer screen to notify the user that email has arrived. Alternatively, audio alarms can also be used to notify the user. In the event that the user is not paying careful attention to the computer display screen, the notice icon may be easily missed. Likewise, if the user steps away from the computer momentarily, an audible alarm may be missed. It would be desirable to have a method of notifying the user when email arrives which would be difficult for the user to miss and which would remain present for the user in the event the user steps away from the computer.

Another application commonly used by users on networks such as the Internet is the use of the computer to carry on conversations via chat rooms. This type of conversation typically is carried on in the form of text messages that are typed into the computer by the user, and which are displayed on a remote computer used by another user. This type of communication can be enjoyable, but it lacks the visual stimulus associated with interacting with another individual in person. It would be desirable to have a method of simulating the presence of others when engaging in activities such as online chats.

Another application has been the development of games in which an individual competes against a software opponent either in a local computer or across a network. As was the case, discussed above in regard to online chat rooms, it may be desirable to have an opponent as a physical presence rather than just an image on a display screen when playing a game against the computer.

Another computer application that has recently become especially popular is the use of games in which players can compete against one another from remote locations using sophisticated networks, such as the Internet. When individuals play games with one another in a non-computer environment, whether they are playing two player games or multi-player games, they typically have the benefit of enjoying reactions from their opponents during the course of play. Unfortunately, a disadvantage associated with computerized network's versions of games, which were heretofore played by individuals in the presence of one another, is that the individual players often find the games too impersonal because of the absence of the physical presence of their opponents. It would be desirable to have a method of simulating the presence of friends and opponents when playing games across computer networks.

While the prior art has provided numerous devices and methods for communicating between a computer and a computer user, it has failed to provide a method of communicating via multimedia data paths which use not only conventional methods of communication such as voice, but also use motion, such that in addition to moving data, also provides a more human feel to enhance the user's experience.

SUMMARY OF INVENTION

The present invention provides a multimedia I/O device for use with computers. The device acts as a three-dimensional multimedia device that provides audio input and output capability, and provides motion data output via a three-dimensional moving figure that uses motion to communicate with the user. It outputs audio messages to users via optional internal speakers, it detects user voice input through an optional internal microphone and inputs it to the computer, and it is also capable of causing the device to move, under software control, to catch the user's attention. The multimedia I/O device is formed in the shape of a selected character and can be formed using any suitable design, such as a human-like character, as a specific individual (e.g., a celebrity, a historical figure, an athlete, a theatrical character, etc.) as a non-human character such as an animal, as any other mythical or imaginary character, or as to any other suitable physical object or mechanical device.

When used by the computer to communicate with the user, it can be made to move, under software control, to catch the user's attention in regard to the arrival of email or other events such as the occurrence of an unexpected hardware or software event that requires the user's attention and/or action. It can also be used to represent remote individuals when the user is in a chat room.

When used in conjunction with games, the device provides a personalized three-dimensional mechanical device that represents actual opponents located in remote computers on a network, or alternatively, represents a software opponent for use in single person games. Optionally, the multimedia I/O device may have voice recognition input to allow the user to enter commands or data into the system.

Another option provides for multiple multimedia I/O devices to be used simultaneously for multi-player games that are played by remotely located users. In addition to games played solely with multimedia I/O devices, it is also possible to use the multimedia I/O devices in conjunction with animated characters displayed on a computer monitor. An optional universal base allows multiple detachable characters attached to the base to the replaceable so that different characters can be substituted for different games, etc.

DETAILED DESCRIPTION

Prior to a detailed discussion of the figures, a general overview of the system will be presented. The invention provides a system that uses a multimedia I/O device that provides a novel method of communication between a computer and a computer user. An advantage of the multimedia I/O device is that it provides 1) the capability of communicating with the user via audio output, 2) the capability of communicating with the user via voice data input, 3) the capability of communicating with the user via selected physical motion of the multimedia I/O device, and 4) the capability of coordinating audio and motion by the head and mouth of the multimedia I/O device to simulate speech. In one aspect, the multimedia I/O device provides for audio output, which may be in the form of specific sounds, and/or recorded voices. The recorded voices may even be prerecorded digital voice data, which uses the voices of the user, acquaintances of the user, celebrity voices, etc.

In addition to providing a means to output audio data, the multimedia I/O device may optionally provide a means to input voice data for processing by voice recognition software. The combination of audio output and voice data input provides a method of communication which is much more human in character than conventional methods of communication with computers, such as data display or printing. This is particularly enjoyable for activities such as gaming, conversations in chat rooms, instant messaging, etc. Further, the human-like feel and convenience of using voice communication between the computer and the user even improves mundane tasks such as receiving email, or saving notification of system events (e.g., printer out of paper, system errors, etc.).

In addition to the audio and voice aspects of the multimedia I/O device, the device also provides for a variety of ways to communicate data via motion. The multimedia I/O device includes a movable character. Mechanical animation under software control also allows the computer to communicate in a variety of manners.

Another advantage associated with the invention is that it can be used to conveniently notify user regardless of the user's location within a building. For example, if a computer is located in one room of a house, and the multimedia I/O device is wirelessly attached to the computer and located in another room, then the computer can activate the multimedia I/O device so that the user will be notified when email arrives even if the user is in another room. Having discussed the invention in general, we now turn to a more detailed discussion of the figures.

Figure 1:
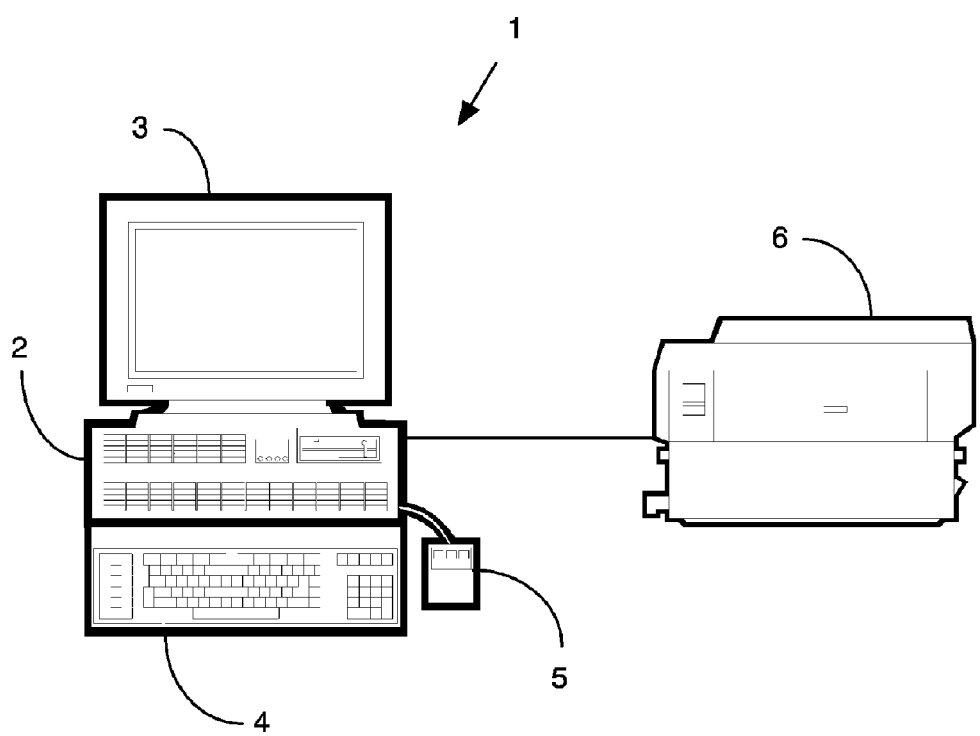
FIG. 1 illustrates a conventional prior art computer system.

In FIG. 1, a conventional prior art computer system 1 is illustrated. This figure illustrates the normal array of devices used to communicate between the user and the computer. Namely, the processor 2 which controls a video display 3, and a printer 6 which are used for output. In addition, it also shows a keyboard 4 and a mouse 5. These basic I/O devices are used in virtually all computers. Unfortunately, there is a substantial drawback to this configuration in that the user must use these basic devices for all activities. In the case of socially oriented activities, such as those discussed above, the user is unable to communicate in a manner, which is more like communicating with another human rather than communicating with a conventional computer.

Figure 2:
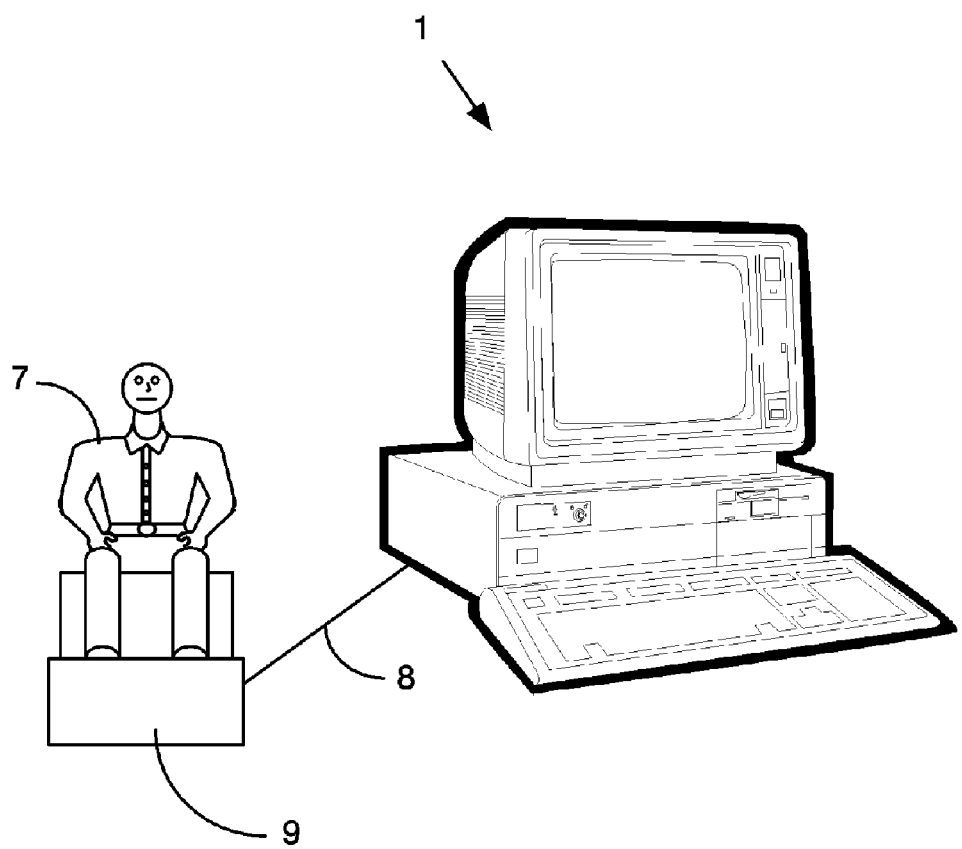
FIG. 2 is a front view of a preferred embodiment of the multimedia I/O device that shows its attachment to a conventional computer system.

FIG. 2 illustrates a preferred embodiment of the invention, which shows the multimedia I/O device 7 attached to a conventional computer system 1. In this figure, the multimedia I/O device 7 is mounted on the base unit 9 and is shown in a seated position. For ease of illustration, the base unit 9 is shown connected to a computer system 1 via a conventional cable 8. Those skilled in the art will recognize that while the base unit 9 and the computer system 1 can communicate via conventional hard wire cable such as cable 8, they can just as easily communicate with one another via a wireless connection. The implementation of wireless interface connections is well known in the art and need not be further discussed here.

While a wireless connection between the computer system 1 and base unit 9 is not critical, it provides a significant advantage over conventional cabling. In particular, a wireless interface between the base unit 9 and the computer system 1 allows the base unit 9 to be located anywhere in an office, building, or other facility. In the event that the multimedia I/O device 7 is intended to be used for notification of messages or for other activities, it can be placed away from the computer system 1 where the user is most likely to be present. As a result, when the user is waiting for an important message, the multimedia I/O device 7 can notify the user as soon as the message is received. In addition, it also allows the user to engage in two-way communication with the computer system 1 from a location, which is remote from the computer system 1. Wireless communications networks between components of a computer system, or multiple computer systems, is well known in the art and need not be explained further here.

A further advantage of a wireless connection is that multiple multimedia I/O devices 7 can be used by a single computer system 1 such that the computer system 1 can communicate with a variety of locations throughout a building. As a result, the user can install several multimedia I/O devices 7 and be able to communicate with the computer system 1, and receive messages, throughout an office or home.

FIG. 2 also illustrates the multimedia I/O device 7 in the form of a human, or life-like device, sitting in a chair. In the preferred embodiment, the multimedia I/O device 7 and its associated base unit 9 are fabricated such that the multimedia I/O device 7 can be detached from the base unit 9. An advantage associated with the two-piece structure illustrated in this figure is that in the event that the multimedia I/O device 7 and base unit 9 were fabricated as a single piece device, this would limit the user's flexibility in terms of how the device is used. Instead, when the multimedia I/O device 7 is fabricated as a detachable unit, then multiple multimedia I/O devices 7 may be used in conjunction with the same base unit 9. This provides an advantage in that a multimedia I/O device 7 which is associated with a particular game character, with a particular user, or which represents any other type of figure, can be conveniently and less expensively used if the same base unit 9 can be reused.

The multimedia I/O device 7 can take the form of any suitable character. It can be a human figure, a celebrity, an action figure, an animal, or even a cartoon character (e.g., SpongeBob Squarepants (TM), the Tick (TM), etc.). The only requirement is that if multiple multimedia I/O devices 7 are fabricated for use with a common base unit 9, they must have a common attachment point such that each figure used as a multimedia I/O device 7 can be detached to the base unit 9 in the same manner, and controlled by the base unit 9, in the same manner even though their outer appearance varies.

In the preferred embodiment, the computer system 1 communicates with the multimedia I/O device 7 via an Application Programming Interface ("API"). An API is the software interface that allows an application program to access the operating system, and other computer resources.

Each API establishes a standard interface which allows application programs and/or system programs to access a particular system resource, such as the multimedia I/O device 7 or other devices. Of course, the API would take into account the unique features of any given device. APIs are well known in the art. In the preferred embodiment, an API defining a standard set of commands associated with particular multimedia I/O device 7 motions will allow any application program to issue instructions to the multimedia I/O device 7. For example, a sample set of commands may read: 1=sit, 2=stand, 3=wave left arm, 4=wave right arm, 5=nod head up and down, 6=shake head back and forth, 7=open mouth, 8=close mouth, etc. The use of the API allows the multimedia I/O device 7 to be used by an application program without requiring detailed knowledge of the internal structure and design of the multimedia I/O device 7. This will allow application programs to be easily modified such that they can take advantage of the features and advantages of the multimedia I/O device 7.

When the multimedia I/O device 7 is integrated with the computer system 1, it can be used as part of a complete system in which any number of software applications (e.g., application programs such as games, Instant Messenger (TM), Excel (TM), WordPerfect (TM), MS Word (TM), etc.) in the computer system 1 may communicate with the user via an API that instructs the operating system to perform a variety actions in regard to the multimedia I/O device 7. The multimedia device 7 can be used to enhance the enjoyment of software applications through its use in combination with other actions taken by a computer program. By way of example, if a user were playing a game of computer chess, the chessboard would typically be displayed on the computer monitor. When the computer makes a move, the multimedia I/O device 7 could stand up and announce the computer's move. Likewise, the user could input moves to the computer system 1 via the microphone 13. The multimedia I/O device 7 could also be used to output messages based on factors such as the length of time the user takes to respond, based on the effectiveness of a move, etc.

In addition to the control of the multimedia I/O device 7 via local application programs, as discussed above, an internet browser can also use an API to allow a remote user to control operation of a local multimedia I/O device 7.

Figure 3A:
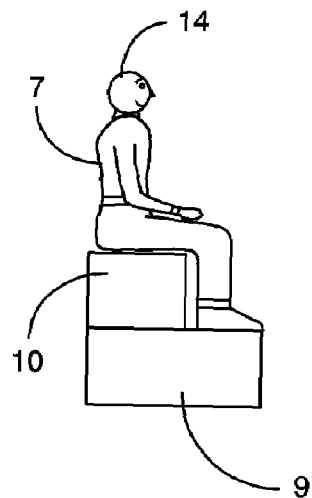
FIG. 3A is a side view of a preferred embodiment of the multimedia I/O device that is shown in the seated position.

In FIG. 3A, a side view of a preferred embodiment of the multimedia I/O device 7 and base unit 9 is shown. In this figure, the character represented by the multimedia I/O device 7 is shown in a seated position. In the preferred embodiment, the seat 10 is an intricate part of the base unit 9. However, the seat 10 may also be detachable from the base unit 9. Because it is detachable, it can take any form, which matches a desired character type. For example, if the multimedia I/O device 7 is made to resemble a particular type of character, such as a king, a queen, etc., then the seat 10, or base unit 9, can be fabricated such that it resembles a throne. This format is useful for board games like chess. For example, while the chessboard is displayed on the video screen, the multimedia I/O device 7 could be used to provide animated commentary and remarks, which would enhance the game of chess by making it more humorous. This approach can be used in combination with any number of games.

For a character such as that represented in this figure, a seated position would typically be used when the device was not communicating with the user. During communication, the character may be sitting or standing.

Figure 3B:
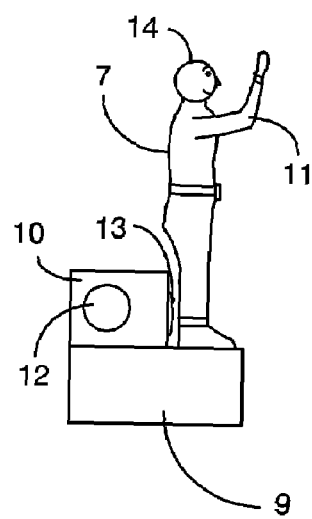
FIG. 3B is a side view of a preferred embodiment of the multimedia I/O device that is shown in the standing position.

In regard to FIG. 3B, this figure shows the preferred embodiment illustrated in FIG. 3A with the multimedia I/O device 7 moved to the standing position. In addition, the multimedia I/O device 7 is also shown with the device's arm 11 in the raised position. As can be seen, the motion capability the multimedia I/O device 7 is not limited to merely sitting or standing up. It can also be made to move one or both arms 11 so that it can emphasize a message and provide more entertainment value. Likewise, the head 14 can also be made to rotate the sideways direction (i.e., silently indicating "no"), or tilt (i.e., nod in agreement). Preferably, the motion of the multimedia I/O device 7 is coordinated with audio output to better simulate real speech. This type of motion allows the multimedia I/O device 7 to present a more natural and more human feel, and further enhances the interaction experience.

This figure also illustrates optional audio output and input features of the invention. For ease of illustration, output speaker 12 is shown located on the side of seat 10. However, those skilled in the art will recognize that the output speaker 12 can be placed in any convenient location. In addition to the audio output speaker 12, this figure also illustrates microphone 13, which is used for inputting voice data from the user. It is also shown mounted in seat 10. From a manufacturing viewpoint, if seat 10 is detachable from base unit 9, then it would be more convenient to have the speaker 12 and the microphone 13 mounted in the base unit 9, below. Of course, those skilled in the art will recognize that while it is possible to mount the audio output speaker 12, and the microphone 13, in the multimedia I/O device 7, they will also realize that this approach will result in a more complicated design.

Figure 4:
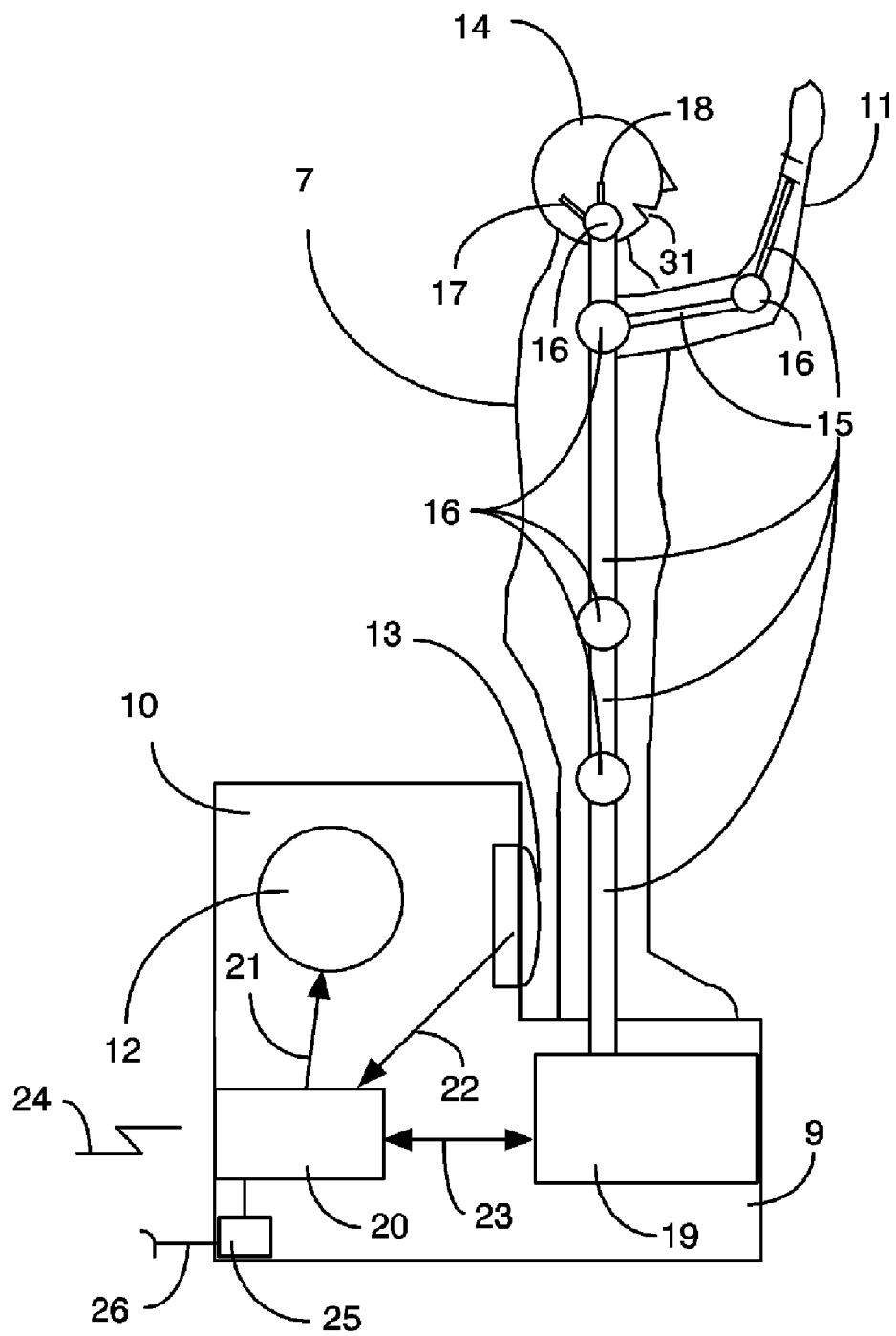
FIG. 4 is a side cutaway view of a preferred embodiment of the invention which shows the mechanical linkages within the multimedia I/O device.

FIG. 4 is a side cut away view of a preferred embodiment of the invention. In this figure, the general overview of the mechanical linkages within the multimedia I/O device 7 is shown. In addition, the linkage 19 between multimedia I/O device 7 and base unit 9 is shown along with the circuitry 20 which controls mechanical operation of the multimedia I/O device 7 and the microphone 13 and audio output speaker 12 which are located in seat 10.

In this figure, motion control elements 15 thru 18 of the multimedia device 7 are illustrated. For ease of discussion, the various motion control elements 15 thru 18 include mechanical rods 15, which provide the structural support for multimedia I/O device 7 (they are joined together at control points 16). Control points 16 can be any suitable multimedia rod control point. In addition, tilt rod 17 is shown detached to a control point 16 inside of head 14. The mechanical linkages within the multimedia I/O device 7 allow tilt rod 17 to tilt the head 14 so that the head 14 appears to be nodding. Likewise, rotational control rod 18 is attached to the mechanical linkages of the multimedia I/O device 7 and the head 14 so that when rotational control rod 18 is rotated, the head rotates left and right (i.e., indicating "no"), or up and down (i.e., indicating "yes"). Further, it is also possible to provide mechanical control of an optional moving mouth 31 component. This allows the audio output to be coordinated with movement of the head 14 and the moving mouth 31 to provide a more realistic simulation of speech.

Mechanical linkages required to move structural elements of the multimedia I/O device, such as the arms, legs, and head, are well known and the art and will not be discussed in further detail herein. While a single linkage connection between the multimedia I/O device 7 and the base unit 9 is preferred for simplicity, those skilled in the art will recognize that it is also possible to have other linkages when the multimedia I/O devices 7 are in the sitting position. In addition, the multimedia I/O device 7 can be motor driven or powered by alternate means of moving the mechanical components, such as through the use of a pneumatic drive system. The device can also be powered by any convenient method, such as battery power, or via a hardwired power source. Likewise, it can be controlled wirelessly with no physical linkage between it and the base unit 9.

The linkage between the multimedia I/O device 7 and the base unit 9 can take any suitable form, such as mechanical linkage, pneumatic linkage, or electrical connections (which provide control signals and possibly power to drive motors inside the multimedia I/O device 7). However, in the preferred embodiment, whichever linkage is used should have a standard configuration such that a variety of multimedia I/O devices 7 can be interchangeably used with a standard base unit 9. With this in mind, the preferred embodiment that uses integral motors inside the multimedia I/O device 7 allows the multimedia I/O device 7 to be attached to the base unit 9 via a single electrical signal and/or power connector.

The linkage between the multimedia I/O device 7 and base unit 9 is made through the bottom of the feet of the multimedia I/O device 7 such that they remain out of sight and do not detract from the appearance of the device. When attached to the base unit 9, the linkages that extend from the bottom of the feet of the multimedia I/O device 7 are inserted into a mechanical control device 19, which manipulates the various rods required to move the various elements of the multimedia I/O device 7. An advantage provided by attaching linkages through the bottom of the feet is that they allow the multimedia I/O device 7 to be controlled in the same manner whether the multimedia I/O device 7 is standing or sitting. Mechanical and pneumatic linkages for controlling moving parts are well known in the art and need not be discussed in further detail here.

This figure illustrates the fact that the seat 10 can be integrated with the base unit 9 so that it is a single device. Also shown in this figure is the control circuitry 20, which communicates with the mechanical control device 19 via cable 23. In addition, control circuitry 20 also outputs data via cable 21 to audio output speaker 12, and inputs received voice data from microphone 13 via cable 22. While control circuitry 20 can be configured with the cable to connect with a computer system 1, this embodiment uses a transmitter that is part of the control circuitry 20 to communicate with computer system 1. The transmitter provides a wireless link by transmitting signals 24 to a receiver and the computer system 1. Power supply 25 is attached to the control circuitry. It receives power from an input power line 26 and is connected to control circuitry 20 that in turn provides power to the mechanical control device 19.

Any suitable power source can be used to power a multimedia I/O device 7. In the case of a locally attached base unit 9, a hardwired source of power will likely be more convenient. Likewise, a multimedia I/O device 7, or base unit 9, which is wirelessly connected to a remote computer system 1 may benefit from a battery power supply.

If the multimedia I/O device 7 is designed to be replaceably attached to the base unit 9 such that a variety of different multimedia I/O devices 7 may be selectively attached to a base unit 9, then it is important that the method of attachment to base unit 9 and mechanical linkages and control elements have the standard configuration to facilitate the interchange of multimedia I/O devices 7.

Figure 5A:
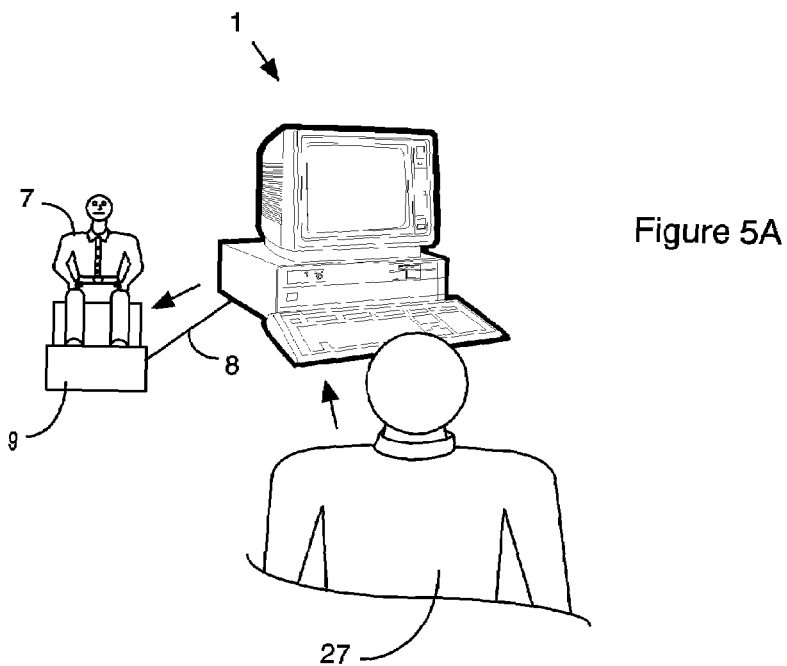
FIG. 5A illustrates a preferred embodiment of the invention in which the user inputs commands to the computer, which in response issues commands to multimedia I/O device.

In FIG. 5A, a preferred embodiment of the invention is shown in which the user 27 inputs commands to the computer system 1. In response to the user's 27 input, the computer software determines what response should be made by the multimedia I/O device 7. The computer system 1 communicates the response to the base unit 9, which commands the multimedia I/O device 7 to perform an action.

Figure 5B:
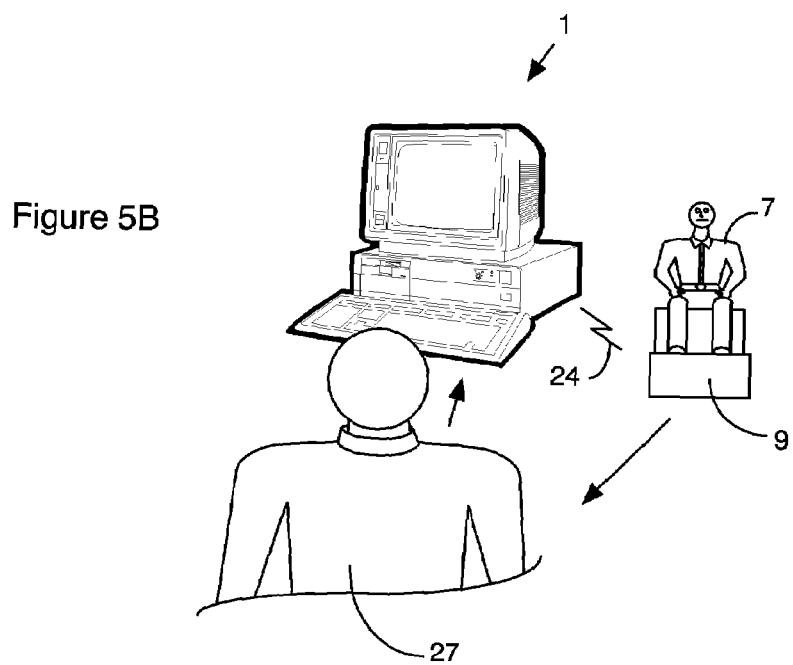
FIG. 5B illustrates a wireless preferred embodiment of the invention in which the user inputs commands to the computer, which in turn instructs the multimedia I/O device to execute a specific function.

FIG. 5B illustrates a wireless preferred embodiment of the invention in which the user 27 inputs data to the computer system 1. In response to the user's 27 input, the computer system 1 communicates output data and commands to the multimedia I/O device 7. The multimedia I/O device 7 can output audio data to the user or execute a specific command which would initiate a specific type of motion, such as standing up, sitting down, nodding the head to indicate "yes," moving the head sideways to indicate "no," waving and arm, etc. Of course, combining several functions makes the multimedia I/O device 7 even more interesting. For example, it can output audio data while standing up and moving its head up or down, etc.

Figure 5C:
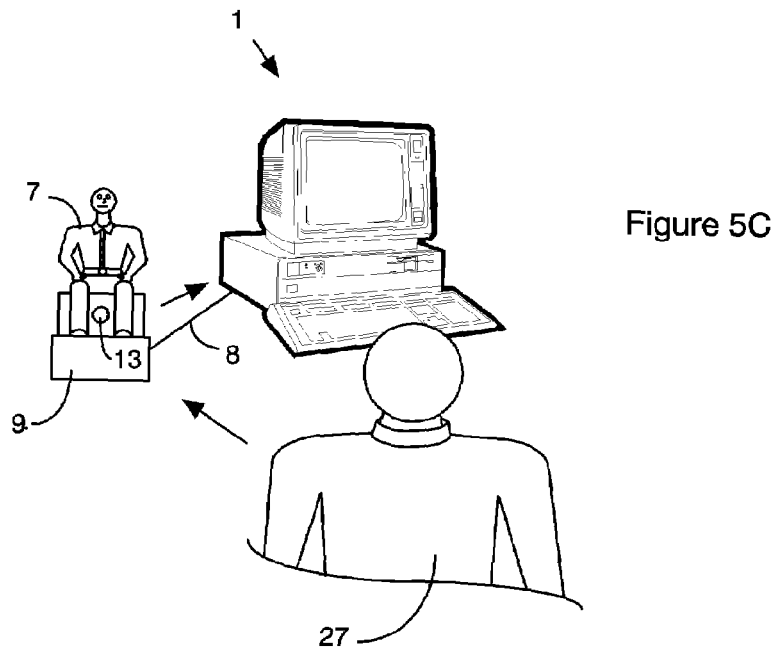
FIG. 5C illustrates a hard wired preferred embodiment in which the user inputs voice commands to the multimedia I/O device, which in turn communicates the voice data to the computer system.

FIG. 5C illustrates a hard-wired preferred embodiment in which the user inputs voice commands or voice data to the microphone input 13 in the multimedia I/O device 7. The multimedia I/O device 7 transfers the voice data to the computer system 1. The computer system 1 then uses voice recognition software to determine what action to take. Voice recognition technology is well known in the art, and is available from a variety of commercial sources. Therefore, it will not be discussed in further detail herein.

Figure 5D:
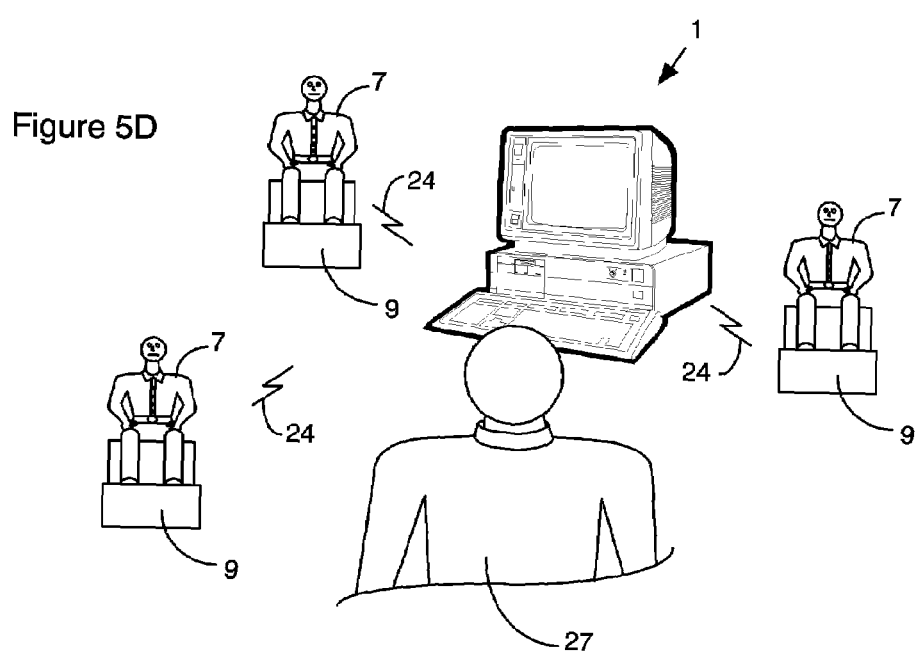
FIG. 5D illustrates another preferred embodiment in which multiple wireless multimedia I/O devices are attached to a computer system for use in multi-player games.

FIG. 5D illustrates another preferred embodiment in which multiple wireless multimedia I/O devices 7 are attached to a computer system 1 for use in multi-player games, or for use by other tasks. When multi-player games are played, they can be played between the user 27 and a software program in the computer system 1, or alternatively, each multimedia I/O device 7 can represent a player on a remote computer 1 located somewhere on a network such as the Internet. As the remotely located player enters commands, and possibly voice data, those commands and voice data can be transmitted via the network to the local computer 1 where the multimedia I/O device 7 communicates with the local user 27 in a variety of ways, including speaking, moving, and listening for input from the local user 27. Of course, the local user 27 would prefer to be able to respond to the remote user in the same manner.

Figure 5E:
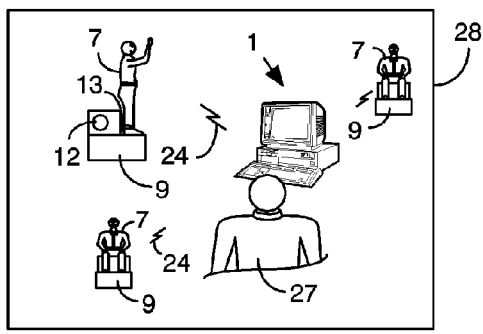
FIG. 5E illustrates another preferred embodiment in which multiple wireless multimedia I/O devices are attached to each of a plurality of computer systems for use in multi-player games across a network such as the Internet.
Figure 5E:
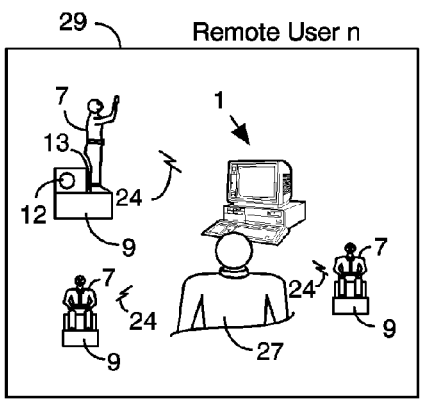
Figure 5E:
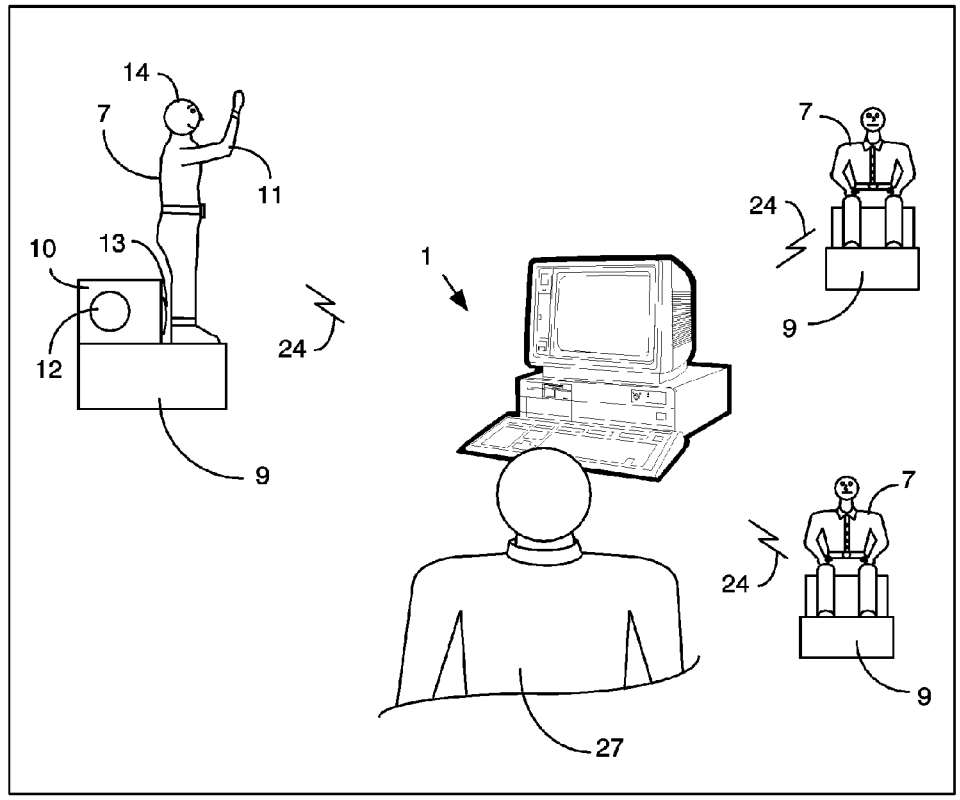

In FIG. 5E, another alternative embodiment of the invention is shown. In this embodiment, the local user 27 is playing the game with two other users 27, each located at a remote user location. Each of the computer systems 1 can communicate with the other computers via the Internet 30. As a result, the computers can be located anywhere. In addition, each computer system 1 has a remote I/O device 7 for each one of the users 27 playing the game. For ease of illustration, three computer systems 1 are shown, with each having three multimedia I/O devices 7 that represent the user at each of the computer systems 1. In this embodiment, the software on one computer system 1 can issue instructions to a remote computer regarding the multimedia I/O device 7 attached to that remote computer system 1. For example, in this figure the user 27 at remote user computer system, identified as computer "n" in the figure, can issue a command which will make the multimedia I/O device 7 on the local user's computer system 1 stand up and raise its arm. As discussed above, the user 27 can enter commands in a variety of ways, including using the microphone 13 and voice recognition software.

An optional feature of the invention allows a local user 27 at a local computer system 1 to input commands and voice data to a multimedia I/O device 7 at a remote computer 1. The user 27 can instruct a local computer system 1 to transfer that user's 27 commands and voice data to a remote computer system 1. Then, the local user's 27 commands will be executed by the remote computer 1, and the local user's 27 voice will be played through the speaker 12 on the remote user's computer system 1. As a result, when playing a game, a local user 27 not only can have one of the remote multimedia I/O devices 7 stand up and make a variety of motions, but it can also speak to the remote user 27 in the actual voice of the local user 27 when transmitting the message. This adds a very human feature to the games and greatly enhances the entertainment value and enjoyment of the games. Of course, in addition to games, this feature can also be used for any number of other activities. For example, it can be very enjoyable when used in chat rooms or when used with instant messaging systems, emails, etc. Further, the ability to remotely control a multimedia I/O device 7 can greatly enhance the enjoyment value of the game or other user activity.

The communication technique provided by this invention allows a user 27 to communicate directly with a computer system 1 in the same manner that the user 27 would communicate with another individual. The computer system 1 can simultaneously output information in several modes, using audio to provide specific data, and motion to help the interpretation of that data due to the conveyance of information that can alter the meaning of the specific audio data (e.g., emotional emphasis, indications of urgency, etc.). In addition, communication via motion also provides entertainment value that is not possible with mere audio data. Further, the addition of voice input via the microphone 13 allows simultaneous two-way communication between the computer system 1 and the user 27.

It should also be noted that while the computer system 1 would normally control the motion of the multimedia I/O device 7, the user 27 could also control the motion of the multimedia I/O device 7 by inputting commands, which the computer system 1 would then use to move the multimedia I/O device 7. These commands can be input by the user 27 as audio data via the microphone 13 (or any other microphone attached to the computer), or as instructions that are manually input via a conventional device such as a keyboard 4 or a mouse 5.

The multimedia I/O device 7 can be used as an I/O device for a question-and-answer session with the user 27, or to facilitate dictation by the user 27. For example, the user 27 can answer a series of questions output by the multimedia I/O device 7. The answers to those questions can then be input from the multimedia I/O device 7 to the computer system 1. Likewise, a multimedia I/O device 7 can be used as an audio dictation input device. The multimedia I/O device 7 can also be used to instruct the computer system 1 to display a message on the computer system 1 monitor. Since the multimedia I/O device 7 can be remotely located (via hard wired or wireless connection) from the computer system 1, the ability to control data transfer between the computer system 1 and the user 27 with the multimedia I/O device 7 provides the user with the ability to control the computer system 1 from any location in the building, office, or home.

As discussed above, the multimedia I/O device 7 can be made to resemble any number of human, animal, or other characters to suit a particular user's tastes or a particular task. Another advantage of removable multimedia I/O devices 7 is that they can be fabricated such that they are related to a particular theme (e.g., movies, cartoons, etc.). For example, in the Christmas season the multimedia I/O device 7 can be fabricated such that it resembles Santa Claus, a snowman, a reindeer, etc. In fact, multimedia I/O devices 7 can be fabricated for any holiday or special event (e.g. birthdays). Likewise, the multimedia I/O device 7 can be fabricated such that it resembles characters from movies or the theater. For example, the characters can represent action figure from movies such as StarWars (TM), the Hulk (TM) etc.

In addition to physical appearance, the control circuit 20 can also incorporate a voice module which is either permanently attached, removable in the form of cartridge, or programmably changeable. The voice module can contain data related to specific games, and/or it can have specific voices, such as celebrity voices. It can also incorporate a variety of tones for certain words to convey more than one meaning. In the event that replaceable multimedia I/O devices 7 are used, it is also possible to incorporate identification technology in the multimedia I/O device 7. In particular, a simple device such as a radio frequency identification device ("RFID") tag can be incorporated into the multimedia I/O device 7. In addition, the base unit 9 can have an RFID tag detector/reader to read the RFID tag in the multimedia I/O device 7. By identifying the specific type of multimedia I/O device 7 which is being attached to the base unit 9, the computer system 1 can automatically select a particular voice file which corresponds to a particular voice, and then use that selected voice with the selected multimedia I/O device 7 which is being currently replaceably attached to the base unit 9. As a result, the voice for a particular multimedia I/O device 7 can be automatically replaced with no action required on the part of the user 27.

In addition to the uses discussed above, the multimedia I/O device 27 can be used for a variety of other functions. For example, it can be remotely attached to computer system 1, which uses timing software to activate the multimedia I/O device 7 such that, if placed in a bedroom, it will act as an alarm clock. For that matter, it can be incorporated directly into an alarm clock so long as the alarm clock has sufficient intelligence to drive the multimedia I/O device 7. In addition to acting as an alarm clock, it can also provide an entertaining way to remind individuals that it is time to take medication. Another application of multimedia I/O device 7 is its use to notify users 27 who are users of bidding or auction systems. For example, Internet applications such as eBay (TM) use specific deadlines for making bids. The computer system 1 can automatically activate the multimedia I/O device 7 to remind individuals that the auction is ready to expire. Likewise, the multimedia I/O device 7 can be used for any number of other applications, such as reminding parents about tasks related to their children, or reminding owners about tasks related to their pets, etc.

Another preferred embodiment, which was not heretofore discussed, is the embodiment in which a multimedia I/O device 7 incorporates all features of the base unit 9 and acts as a stand-alone device which communicates directly with the computer 1 without an intervening base unit 9. Those skilled in the art will recognize that the stand-alone embodiment of the invention can be used as a local unit attached via a cable to the local computer 1, or can be remotely located away from the computer 1 in another area of the building. In this embodiment, the multimedia I/O device 7 can be represented by any selected character. For example, a rabbit, dog, cat, or any other suitable animal figure can incorporate all of the features of the base unit 9 along with an integral battery power supply and a wireless transceiver. In this configuration, the figure can move in a much more unrestricted fashion since it is not limited by connection to a base unit 9. In addition, this configuration also allows a much more natural and life-like interface, which will provide a substantial amount of enjoyment and entertainment.

The three-dimensional shape and motion capability of the invention provides a substantial advantage over the prior art in that by its nature, a three-dimensional moving device is much more noticeable and provides a much more life-like feel. In addition, it provides a new method of communication between the user and the computer system 1. While prior art computers were generally restricted to audio or video methods of communication with a user, the invention provides a new method of communication. Namely, the invention allows the user and the computer to communicate via motion. Motion is much more noticeable and more emphatic than traditional methods of human/computer communication. In addition, physical motion can be much more efficient in that not only can a simple gesture communicate a substantial amount of data, a gesture can also communicate a substantial amount of emotional information (e.g., humor, anger, sadness, etc.) in addition to just the factual data which is the primary type of information communicated by conventional computer I/O devices.

The previous discussions of wireless communications between the multimedia I/O device 7 and the computer 1 have focused on the use of wireless communications between the multimedia I/O device 7 which was relatively close to computer 1. However, those skilled in the art will recognize that the distance between the multimedia I/O device 7 and the computer 1, is only limited by the distance limitations of the particular communications link. With the advent of higher-powered wireless networks, the multimedia I/O device 7 does not even have to be in the same building as the computer 1. This is especially useful in the situation where multiple multimedia I/O devices 7 are attached to the same system and placed in various locations in a building, or even in more than one building. In that situation, they can be used as a local communications system. For example, if the computer system is located in a den of a home, a first wireless multimedia I/O device 7 is located in the kitchen of the home, and a second wireless multimedia I/O device 7 is located in a child's bedroom, a mother can input voice data to the first multimedia I/O device 7 to instruct the computer system 1 to communicate with a child in a specific room. The computer system 1 will receive the mother's instructions, and then activate the second multimedia I/O device 7 to send a mother's message to the child. In addition, the computer system 1 can input a specific message in a mother's voice and then output the message to the second multimedia I/O device 7 located in the child's room. The second multimedia I/O device 7 can be commanded by the computer system 1 to make specific motions and to speak to the child in the mother's voice. This can even be done without the mother's intervention. For example, the computer 1 can be programmed to automatically notify a child when chores are to be done, when it is time to leave for school, when it is time to go to bed, etc. The mother can record a message now, and then instruct the computer system 1 to send the message to the child at a later time. In addition, the mother can also instruct the computer system 1 to send the message on a recurring basis. An example of how this would work is as follows. The mother records a message telling the child to wake up and get ready for school. She then instructs the computer system 1 to send this message every weekday morning during the school year. As a result, the computer system 1 automatically sends messages on specific days for a specific purpose. This recurring message capability can be used for any number of activities, in addition to the alarm clock function discussed above.

For ease of illustration, the foregoing example used the home to illustrate how the multimedia I/O device 7 could convey information throughout a home, those skilled in the art will recognize that the advantages provided by remotely located multimedia I/O devices 7 could just as easily be provided for a commercial office environment. Therefore, it should be assumed throughout this specification that while a particular example may use a home environment or an office environment, the invention can in fact be used anywhere that computers are used, including homes, offices, schools, etc.

The computer system 1 can also be used to take voice data input in the user's voice and translate it to a second voice. For example, if two remotely located users 27 are exchanging voice data, the computer system 1 can send the user's 27 actual voice to a remote system. However, using voice recognition software, the computer system 1 can determine which words are selected and then substitute a different voice from a voice module and send that voice to the remote system. This provides an entertaining novelty feature in that the user at the remote system will hear the local user's words spoken in a recognizable voice such as that of a mother, character, animal, or cartoon, celebrity, etc.

In the discussions related to the foregoing preferred embodiments, a variety of features, such as audio output or audio input, have been discussed such that they are an integral component of the invention. However, it should be understood that the use of motion as a communications technique can be successfully used without the need for audio output or input. Of course, the combination of motion communications with optional audio output and/or voice input will greatly enrich the effectiveness of the communications process, because a communication method which uses motion, audio output and voice input is more consistent with communications between humans rather than communications between humans and a machine such as a computer system 1. As a result, this type of multimedia communication will be more enjoyable and comfortable for a user.

In addition to the fact that the speaker 12 and the microphone 13 can be optional, their locations are also optional. For ease of illustration, in the figures the speaker 12 and the microphone 13 were shown as integral components of the base unit 9 which may incorporate a seat 10, or have the seat 10 as a separate unit. Integrating the speaker 12 and the microphone 13 into the base unit 9 allows the multimedia I/O device 7 to be fabricated and marketed with all of the components included in a single convenient device. However, those skilled in the art will recognize that the speaker 12 and the microphone 13 can be placed in any suitable location. For example, they can be independent freestanding devices, they can be integrated into the computer system 1, they can be part of the multimedia I/O device 7, etc. Since the audio output and input is invisible to the user 27, their integration with the multimedia I/O device 7, the base unit 9, or the seat 10 is not required.

Figure 6:
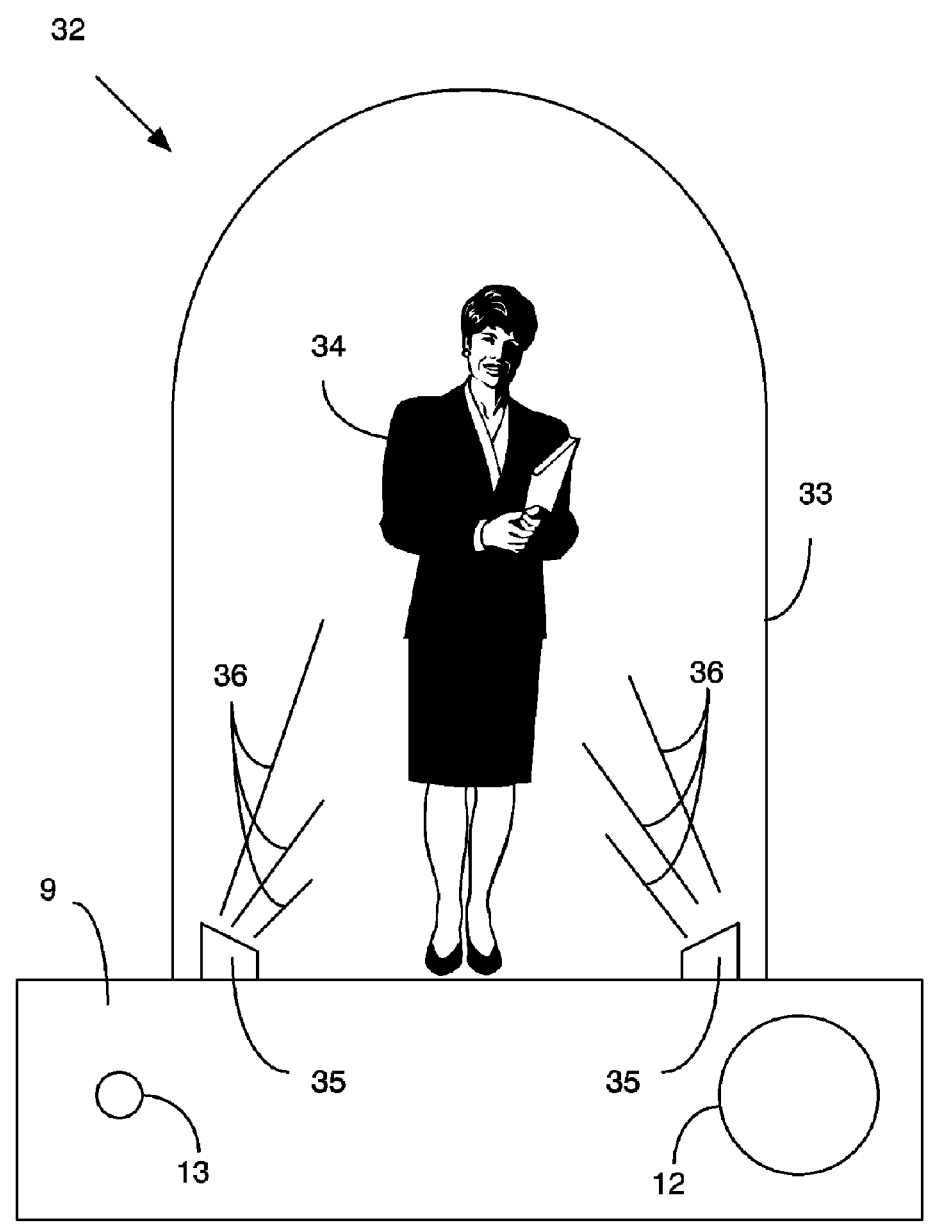
FIG. 6 illustrates another alternative preferred embodiment in which the mechanical multimedia I/O device shown in the previous embodiments is replaced with a holographic I/O device.

FIG. 6 represents another alternative embodiment that replaces the mechanical multimedia I/O device 7 with a hologram 34 that is generated by the base unit 9. The advantage of a holographic I/O device 32 over a mechanical multimedia I/O device 7 is that the holographic I/O device 32 has an unlimited number of potential characters, and further, it does not have any moving parts to wear out or break.

In this figure, the base unit 9 includes a microphone 13 and a speaker 12 to allow the user 27 and the computer system 1 to engage in an audio conversation in the same manner as was done in the previous embodiments. Also shown in this figure is a transparent cover 33 and holographic projectors 35. The holographic projectors 35 project beams 36 which interact to create a three-dimensional hologram 34.

Those skilled in the art will recognize that use of a computer-generated hologram 34 provides the system the ability to produce an unlimited number of characters and images that will greatly enhance the enjoyment of the device. For example, while it is possible to select any number on pre-programmed characters into a database, it is also possible for the holographic I/O device 32 to be combined with a camera system that will allow the local user's image to be projected by the holographic projectors 35 on the remote system. Likewise, the remote users can have their images presented on the local holographic I/O device 32. This provides an enormous benefit to users in that they can enjoy 3-D holographic images of friends and family in real time. This provides a substantial enhancement over prior art e-mail, instant messaging, and chat room software systems.

The system presented herein provides a unique combination of features that creates a new method of communicating between a user and a computer system. The system provides a multimedia I/O device that communicates with motion, with voice input, and with voice output. Further, it can also be used in conjunction with pre-existing I/O devices such as a display monitor, keyboard, or a mouse. It provides an interface which has a human-like feel and which even allows for the communication of emotional states, which was heretofore not available. It provides a method of substituting individual characters, which are represented by the multimedia I/O devices, by attaching the multimedia I/O devices to a universal base unit. It further allows this communication to be carried on remotely from the computer via a wireless link, or through a network with interaction between remote users. The system is also intended to be used with a software interface, such as an API interface, which will allow it to be used by any application program in the computer.

While the invention has been described with respect to a preferred embodiment thereof, it will be understood by those skilled in the art that various changes in detail may be made therein without departing from the spirit, scope, and teaching of the invention. For example, the material used to construct the multimedia I/O device may be anything suitable for a particular type of character. The size and shape of the multimedia I/O device can vary. The type and number of multimedia I/O devices can vary, and can be mixed such that different characters can be used simultaneously. Any suitable type of multimedia drive mechanism can be used to move elements of the multimedia I/O device. For example, mechanical drives can be used, pneumatic drives can be used, and electronic drives with motors inside the multimedia I/O device can be used. Motor driven documents can be powered via electrical connections between the multimedia I/O device and base unit, or powered via batteries. Accordingly, the invention herein disclosed is to be limited only as specified in the following claims.

We claim:

1. A motion based multimedia I/O system for bidirectional communication of information between one or more computer applications and a user, further comprising:
    an I/O device, further comprising:
        at least one movable figure, further comprising;
            a preselected ornamental appearance, a plurality of movable components, and a first universal adapter operatively connected to the movable components;

a base unit, further comprising;
    a second universal adapter having a plurality of connections for removably attaching to the first movable adapter; the second universal adapter in the base unit having means to control the first universal adapter such that movement of one or more preselected movable components in the movable figure are controlled by the base unit via the second universal adapter; and
    the first and second universal adapters are removably attached to one another such that the movable figure can be detached from the base unit, and replaced with another movable figure;
the base unit having means to initiate and control predetermined motions of the movable figure under control of the second universal adapter in the base unit in response to instructions from a computer, the instructions from the computer issued from one or more independent programs through a common interface, and the movements of the movable components having specific meaning for a user;
whereby the base unit controls the detachable movable figure such that motion based communications is made between one or more independent software programs in a computer and an individual.

2. A system, as in claim 1, wherein:
the base unit communicates with the computer via a wireless link.

3. A system, as in claim 2, wherein:
the movable figure further comprises a base unit and a movable figure.

4. A system, as in claim 1, wherein:
the base unit is remotely located from the computer.

5. A system, as in claim 4, wherein:
the base unit communicates with the computer over a network.

6. A system, as in claim 5, further comprising:
the base unit further comprises a microphone for inputting voice data to the computer; and
the base unit transmits the voice data to a computer over a network.

7. A system, as in claim 6, further comprising:
the base unit further comprises a speaker for outputting voice data from the computer;
means to enter the user's voice data into a voice data set, and:
means to output the user's voice from the voice dataset to the user's I/O device or an I/O device on a remote computer.

8. A system, as in claim 7, further comprising:
means to select a voice from a voice data set and substitute the selected voice for the input voice data.

9. A system, as in claim 8, further comprising:
means to store user voice data into the voice data set;
means to output the user's voice data from the voice data set to the speaker; and means to transfer the user's voice data to a remote computer for output on a remote I/O device.

10. A system, as in claim 3, further comprising:
a base unit, having means to removably attach to the movable figure, and further having means to movably control the motion of the movable figure; and
the movable figure having means to attach to the base unit.

11. A system, as in claim 1, wherein the movable figure communicates directly with the computer.

12. A system, as in claim 1, wherein:
the multimedia I/O device can be automatically activated by the computer to provide programmed alarms, predetermined events, and/or timed messages.

13. A multimedia I/O system for communicating with a computer, further comprising:
a common software interface configured to accept instructions from one or more independent programs in a computer;
a plurality of multimedia I/O devices, each multimedia device further comprising:
    a movable figure, further comprising:
        a plurality of movable components, and a first universal adapter operatively connected to the movable components;
    a base unit, further comprising:
        a second universal adapter having a plurality of connections for removably attaching to the first universal adapter; the second universal adapter in the base unit having means to control the first universal adapter such that movement of one or more preselected movable components in the movable figure are controlled by the base unit via the second universal adapter; and
    the first and second universal adapters are removably attached to one another such that the movable figure can be detached from the base unit, and replaced with another movable figure;
whereby the multimedia I/O devices act as intermediary communications devices that allow motion based communication between multiple programs and a user.

14. A system, as in claim 13, wherein:
each of the multimedia I/O devices communicates directly with the computer.

15. A system, as in claim 13, further comprising:
at least one base unit, the base unit having means to attach to a multimedia I/O device;
the base unit communicates further comprises a wireless communications link.

16. A system, as in claim 14, wherein:
at least one of the plurality of multimedia I/O devices is located at a remote location from computer.

17. A system, as in claim 13, wherein:
the multimedia I/O device outputs notification of system events, including e-mail, incoming user messages, system status messages, and scheduled messages.

18. A system, as in claim 13, wherein:
the multimedia I/O device is used as a movable game figure in conjunction with software games.

19. A system, as in claim 13, wherein:
the multimedia I/O device is used to represent individuals in a chat room.

20. A system, as in claim 18, wherein:
movable multimedia I/O devices are used to represent individual players in multiplayer games.

21. A multimedia I/O system for communicating information between a computer and a user, further comprising:
a computer having a programmable processor and storage means for storing computer programs;
at least one computer program further having means to execute programming instructions to a base unit for controlling a movable figure;
at least one movable figure having a first universal adapter;
the base unit having a second universal adapter to attach to the first universal adapter such that the second universal adapter controls movement of individual movable components of the movable figure; and a common interface between the programmable processor and the base unit having a predetermined interface format which allows multiple computer programs to independently access the base unit and control movement of the movable figure;

whereby the multimedia I/O system acts as an intermediary communications device between one or mare independent software programs in a computer and an individual that communicates information via movable figure motion.

22. A system, as in claim 21, further comprising:

a speaker, electrically attached the multimedia I/O device, for outputting audio data; and an interface for communicating between computer programs and the base unit, for receiving output audio data for output by the speaker and for receiving instructions from the computer programs for controlling movement of the movable figure.

23. A system, as in claim 22, further comprising:

a microphone for inputting audio data;

means to transfer the input audio data to a computer program via the interface; and the computer program having means to respond to the input audio data by outputting audio data and instructions to the base unit for controlling movement of the movable figure;

whereby the user can interact with a computer program by inputting audio data to the computer program, and receiving audio and motion output from the computer program.

24. A system, as in claim 23, further comprising:

communication means in the computer to communicate with a network of computers, the communication means further having means to receive software instructions from remote computers for controlling the base unit motion and for activating the movable figure and for inputting and outputting data by the movable figure via the base unit.

25. A system, as in claim 23, further comprising:

means to automatically output audio data and/or activate the base unit to move the movable figure when a preselected event is detected.

26. A system, as in claim 25, wherein:

the preselected event is a system error, a timed event, or an alarm.

27. A system, as in claim 23, further comprising:

voice data collection and storage means to store a variety of voice data types from a variety of sources;

means to select voice data stored in the voice data collection and storage means by entering voice commands into the microphone, and outputting the selected voice data via the speaker.

28. A system, as in claim 10, wherein:

the speaker and the microphone are integrated into the base unit.

29. A system, as in claim 21, wherein:

the movable figure includes attachment means, having a plurality of connections, to attach to the a universal adapter in the base unit;

the base unit includes a universal adapter, which has a plurality of attachment connection, to attach to attachment means on the movable figure; and the movable figure is removably attached to the base unit such that the base unit can be attached to different movable figures;

whereby the base unit and the movable figures have mutually corresponding and detachable universal adapters which allow different movable figures to be interchangeably used in conjunction with a single base unit.

30. A system, as in claim 21, further comprising:

a manual input device, mainly a game controller, a joystick, a mouse, or a keyboard for inputting data to the computer for controlling the multimedia I/O device.

31. A system, as in claim 18, further comprising:

monitoring means to monitor user activity to determine if a specific instruction has been entered, if a specific event has occurred, or if a predetermined time period has been exceeded; and means to automatically activate a predetermined response under control of the monitoring means if the specific instruction was entered, if the specific event occurred, or if the predetermined time period was exceeded.

32. A system, as in claim 23, further comprising:

a microphone to input voice data to the multimedia I/O device;

means to output the voice data to a speaker associated with a second multimedia I/O device on a remote computer.

33. A system, as in claim 1, further comprising:

a base unit having means to receive electronic data and convert it to holographic data, a holographic data input to holographic projection means for projecting a holographic image; and the movable figure is the holographic image.

34. A method of using motion to communicate information between computers and individuals, including the steps of:

using a plurality of independent software applications to control an I/O device, which has a base unit, and one or more movable figures that are detachably attachable to a universal adapter in the base unit, the universal adapter having means to initiate movement of and independently control a plurality of movable components in the movable figure, the software applications controlling the I/0 device via a common interface having a predetermined interface format which allows the software applications to independently access the movable figure, via the base unit, which controls the movable components independent from one another, for the purpose of outputting information via specific controlled movements of the I/O device, the movable I/O device is positioned in view of an individual such that the individual is provided with information based on motion; and associating specific events with specific movements such that when the individual observes a particular movement, information regarding a specific event is provided by the computer to the individual;

whereby an individual can be notified of specific events by a plurality of software applications in the computer based on particular movements of the I/O device which are controlled by the computer.

35. A method, as in claim 34, including the additional steps of:

using an I/O device which is structured to resemble a known character; and moving portions of the I/O device in a manner similar to the normal movement of the known character;

whereby the behavior of the known character can be mimicked by the I/O device.

36. A method, as in claim 35, including the additional steps of:
- structuring the I/O device to resemble known characters including humans, animals, cartoon characters, robots, or machines; and
- moving the I/O device such that movements of the I/O device resemble movements related to specific behavioral states, including humor, sadness, excitement, relaxation, anger, or concern of the particular known character mimicked by the I/O device;
- whereby the behavior of known characters can be mimicked to convey information.

37. A method, as in claim 36, including the additional step of:
- selecting the motion used by the I/O device from a plurality of motions based on preselected factors;
- whereby the computer can alter the motions used for a particular specific event or expected input based on preselected factors.

38. A method, as in claim 37, including the additional step of:
- outputting audio output from the I/O device, under control of the computer, and coordinating motion data with audio data in a single communication;
- whereby the I/O device more closely resembles the known character represented by the I/O device.

39. A method, as in claim 38, including the additional steps of:
- using a microphone to input audio data from the individual to the computer; and
- using voice recognition software in the computer to analyze the audio data input by the individual and respond to instructions or data contained in the audio data;
- whereby the individual can issue commands, or enter data, to the computer via the microphone.

40. A method, as in claim 39, including the additional steps of:
- remotely locating the movable I/O device in a remote location from the computer, to allow remote communication between a computer and an individual; and
- using a wireless connection between the I/O device and the computer such that the user can move the I/O device from one location to another and remain in communication with the computer;
- whereby the individual can carry the movable I/O device from one location to another and remain in communication with the computer.

41. A method, as in claim 40, including the additional step of:
- using a plurality of movable I/O devices, each associated with an individual, located in remote locations from the computer and portable such that each individual can carry the individual's respective I/O device from one location to another to allow remote communication between multiple individuals via the computer.

42. A method, as in claim 41, including the additional steps of:
- storing, in an audio data library, a plurality of selectable unique audio data, including voice data; and
- selecting and outputting portions of the unique audio data;
- whereby the unique audio data is output by the I/O device.

43. A method, as in claim 42, including the additional step of:
- storing voice data from the individual in the audio data library, and selecting and outputting portions of the voice data to the I/O device;
- whereby the individual's voice is output from the I/O device.

44. A method, as in claim 39, including the additional step of:
- using a plurality of movable I/O devices, located in remote locations from the computer, to allow remote communication between a computer and a plurality of individuals.

45. A method, as in claim 39, including the additional steps of:
- playing a game on a computer; and
- using the I/O device to represent a character from the game;
- whereby the I/O device can communicate directly with the individual for the character in the game.

46. A method, as in claim 39, including the additional steps of:
- attaching a computer to a network of computers having at least one remote computer;
- attaching multiple I/O devices to the computer, and having at least one of the I/O devices represent an individual on the remote computer; and
- controlling via the remote computer, the motion and audio output of the I/O device that represents the individual using the remote computer;
- whereby multiple remote users can have individual I/O devices on the computer which allows then to produce motion data on the local computer.

47. A method, as in claim 39, including the additional steps of:
- attaching a computer to a network of computers having at least one remote computer;
- attaching multiple I/O devices to the computer, and having at least one of the I/O devices represent a remote computer; and
- outputting motion data from the remote computer to the I/O device via the network that represents system events on the remote computer;
- whereby the remote computer can control motion on the I/O device.

48. A method, as in claim 35, including the additional steps of:
- playing a game on a computer; and
- using the I/O device to represent a character from the game;
- whereby the I/O device can communicate directly with the individual for the character in the game.

49. A method of communicating between computers and individuals, including the steps of:
- using a base unit and a plurality of detachable moving figures to form a portable I/O device as an interface between a computer and an individual such that the computer can output information to the individual, and the individual can input data to the computer; and
- using communication means in the base unit to communicate with the computer, and using a universal adapter that has a plurality of connections in the base unit to control independent movement of multiple movable components in the movable figure attached the base unit;
- providing a wireless link as the communication means between the computer and the base unit such that the portable I/O device can be remotely located from the computer;
- whereby an individual can control and interact with the computer using a portable I/O device, and can move the portable I/O device from one location to another while controlling and interacting with the remotely located computer.

50. A method, as in claim 49, including the additional steps of:
using movable components in the portable I/O device, which are controlled by the computer, to convey information output from the computer to an individual via specific controlled movements of the portable I/O device that are visible to the individual; and
associating specific events with specific movements such that when the individual observes a particular movement, information regarding a specific event is provided by the computer to the individual;
whereby the individual can be notified of specific events by the computer based on particular movements of the portable I/O device which are controlled by the computer.

51. A method, as in claim 49, including the additional steps of:
using an I/O device which has a figure shaped to represent a preselected character or object;
a base unit, removably attached to the figure, and having an integrated computer processor, the integrated computer processor in the base unit further having software to control the movable components in the portable I/O device, the instructions from the computer issued from one or more independent programs through a common interface;
a microphone to input voice data to the integrated computer processor, the microphone electrically attached to either the figure or the base unit;
a voice dataset having a plurality of selectable voices;
means to input the user's voice into the voice dataset as a selectable voice;
a speaker to output audio data, the speaker electrically attached to either the figure or the base unit;
the integrated computer processor further having software for synthesizing output audio data from digital data received from the computer or for outputting audio data received from the computer;
the integrated computer processor further having voice recognition software for converting input voice data to digital data for transmission via the wireless link to the computer;
whereby an individual can communicate with one or more independent software programs in a computer using motion output data, output audio data and input voice data, and the processing overhead related to the conversion of input voice data to digital data and synthesis of output audio data is absorbed by the integrated computer processor and not by the computer.

52. A system, as in claim 1, wherein the common interface is an API software interface.

53. A system, as in claim 21, wherein the common interface is an API software interface.

54. A system, as in claim 49, wherein the common interface is an API software interface.

55. A system, as in claim 1, further comprising:
software in a computer for controlling the base unit and the movable figure;
the base unit further comprises:
circuitry in the base unit having means to control a universal adapter in the base unit which attaches to the movable figure and in turn independently controls the motion of a plurality of movable components in the movable figure in response to commands from the software; and
whereby software can control the movable figure independent of direct control of the computer by issuing commands to the circuitry.

56. A system, as in claim 21, further comprising:
software in a computer for controlling the base unit and the movable figure;
the base unit further comprises:
circuitry, having means to control motion of the movable figure in response to commands from the software; and
whereby software can control the movable figure independent of direct control of the computer by issuing commands to the circuitry.

57. A method, as in claim 35, including the additional steps of:
using the movable figure, when playing a game on a computer, to represent the character from the game, the movable figure directly communicating with a user by motion and/or audio Output.

58. A system, as in claim 21, further comprising a speaker for outputting audio data under control of the computer program.

59. A system, as in claim 1, wherein:
the movable figure includes attachment means to attach to the universal adapter in the base unit, the attachment means further having means to control individual components of the movable figure;
the base unit includes a universal adapter, which attaches to the attachment means on the movable figure, and controls the movement of individual components of the movable figure via the attachment means; and
the attachment means in the movable figure is removably attached to the universal adapter on the base unit such that the base unit can be attached to different movable figures;
whereby the base unit and the movable figures have mutually corresponding and detachable universal adapters which allow different movable figures to be interchangeably used in conjunction with a single base unit, and which multiple components inside of a movable figure are independently controlled and moved.

* * * * *